US008473159B2

(12) United States Patent
Oyama

(10) Patent No.: US 8,473,159 B2
(45) Date of Patent: Jun. 25, 2013

(54) VARIABLE GAIN CONTROL NOSE WHEEL STEERING SYSTEM

(75) Inventor: Hiroki Oyama, Summerfield, NC (US)

(73) Assignee: Honda Patents & Technologies North America, LLC, Torrance, CA (US)

( * ) Notice: Subject to any disclaimer, the term of this patent is extended or adjusted under 35 U.S.C. 154(b) by 337 days.

(21) Appl. No.: 12/900,825

(22) Filed: Oct. 8, 2010

(65) Prior Publication Data

US 2012/0089277 A1   Apr. 12, 2012

(51) Int. Cl.
G06F 19/00   (2011.01)

(52) U.S. Cl.
USPC .............................................. 701/41; 701/3

(58) Field of Classification Search
None
See application file for complete search history.

(56) References Cited

U.S. PATENT DOCUMENTS

| 2,814,452 A | 11/1957 | Blanchard et al. |
| 3,067,832 A | 12/1962 | Wohl |
| 3,885,759 A | 5/1975 | Lear |
| 4,011,771 A | 3/1977 | Harris et al. |
| 6,722,610 B1 | 4/2004 | Rawdon et al. |
| 6,732,979 B1 | 5/2004 | Kilner et al. |
| 2004/0059497 A1 | 3/2004 | Sankrithi |
| 2008/0188998 A1 | 8/2008 | Venios et al. |

OTHER PUBLICATIONS

International Search Report and Written Opinion of PCT/US2011/055146 dated Feb. 27, 2012.

*Primary Examiner* — Michael J Zanelli
(74) *Attorney, Agent, or Firm* — Rankin, Hill & Clark LLP

(57) ABSTRACT

A method for determining a target steering angle for nose landing gear of an aircraft includes receiving rudder pedal input data into a steering control unit, receiving aircraft speed data into the steering control unit, calculating a normal gain, calculating a parking gain, and adding the normal gain and the parking gain to determine the target steering angle. The normal gain is a positive quantity in all aircraft speed and pedal stroke ranges. The parking gain is a positive quantity in parking and taxiing speed ranges. A nose wheel steering system is also disclosed.

15 Claims, 8 Drawing Sheets

VARIABLE GAIN CONTROL NOSE WHEEL STEERING SYSTEM

BACKGROUND

When an aircraft is on the ground, it is desirable to provide the aircraft with a large steering angle to facilitate parking the aircraft. At high speed conditions, such as before take off, the nose wheel steering angle should be restricted to a small amount of angle.

Business jets use a nose wheel steering system that is a steer-by-wire system. Aircraft using a steer-by-wire system can adjust the nose wheel steering angle with rudder pedal stroke. A known steer-by-wire system has simplified two-stage steering modes each having a different steering angle for the same pedal stroke.

SUMMARY

A method for determining a target steering angle for nose landing gear of an aircraft includes receiving rudder pedal input data into a steering control unit, receiving aircraft speed data into the steering control unit, calculating a normal gain, calculating a parking gain, and adding the normal gain and the parking gain to determine the target steering angle. The normal gain is a positive quantity in all aircraft speed and pedal stroke ranges. The parking gain is a positive quantity in parking and taxiing speed ranges.

A method for determining a target steering angle for nose landing gear of an aircraft includes receiving rudder pedal input data into a steering control unit, receiving aircraft speed data into the steering control unit, calculating a gain K, calculating a gain A, calculating a gain C, calculating a gain B, and determining a target steering angle for a nose landing gear. The target steering angle is a summation a normal gain and a parking gain. The received rudder pedal input data corresponds to a percentage of an input stroke of a rudder pedal on the aircraft. The gain K and the gain C are based on the received rudder pedal input data. The gain A and the gain B are based on the received aircraft speed. The normal gain is a product of the gain K and the gain A and the parking gain is a product of the gain C and the gain B.

A steering control unit ("SCU") for a nose wheel steering system for an aircraft includes a normal gain calculation module, a parking gain calculation module, and a target steering calculation module. The normal gain calculation module calculates a normal gain, which is a positive quantity in all aircraft speed and pedal stroke ranges. The parking gain calculation module calculates a parking gain, which is a positive quantity in parking and taxiing speed ranges. The target steering calculation module adds the normal gain and the parking gain to determine a target steering angle.

DETAILED DESCRIPTION

Figure 1A:
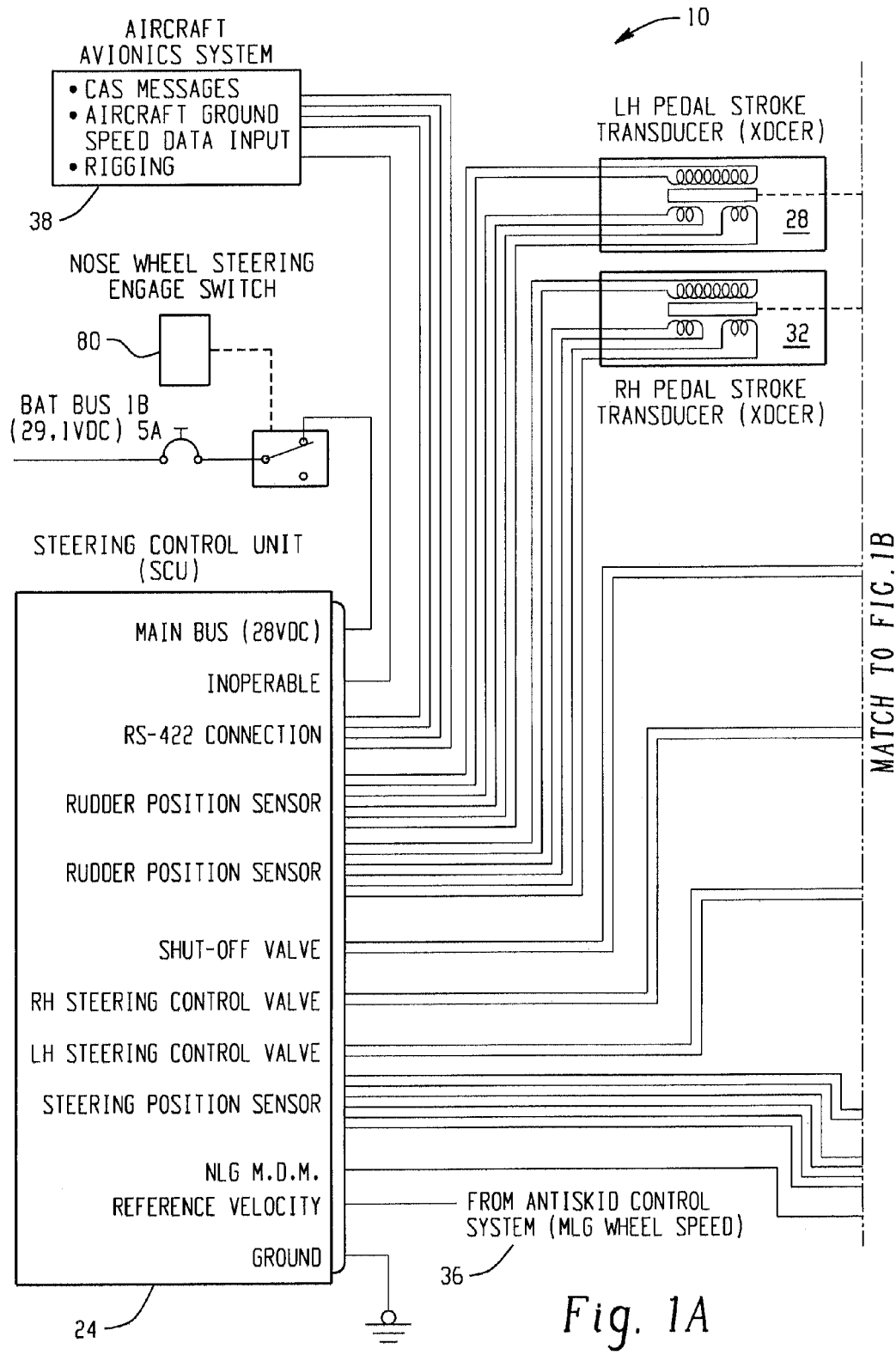
FIGS. 1A and 1B are a schematic depiction of a hydraulic and electrical system for a nose wheel steering system for an aircraft.

The descriptions and drawings herein are merely illustrative and various modifications and changes can be made to the structures and steps disclosed in the drawings without departing from the scope of the appended claims. Various identified components disclosed herein are merely terms of art and may vary from one manufacturer to another. The terms should not be deemed to limit the present disclosure. The drawings are shown for purposes of illustrating one or more exemplary embodiments and are not for purposes of limiting the appended claims. All references to direction and position, unless otherwise indicated, refer to the orientation of the components illustrated in the drawings and should not be construed as limiting the appended claims.

Figure 1B:
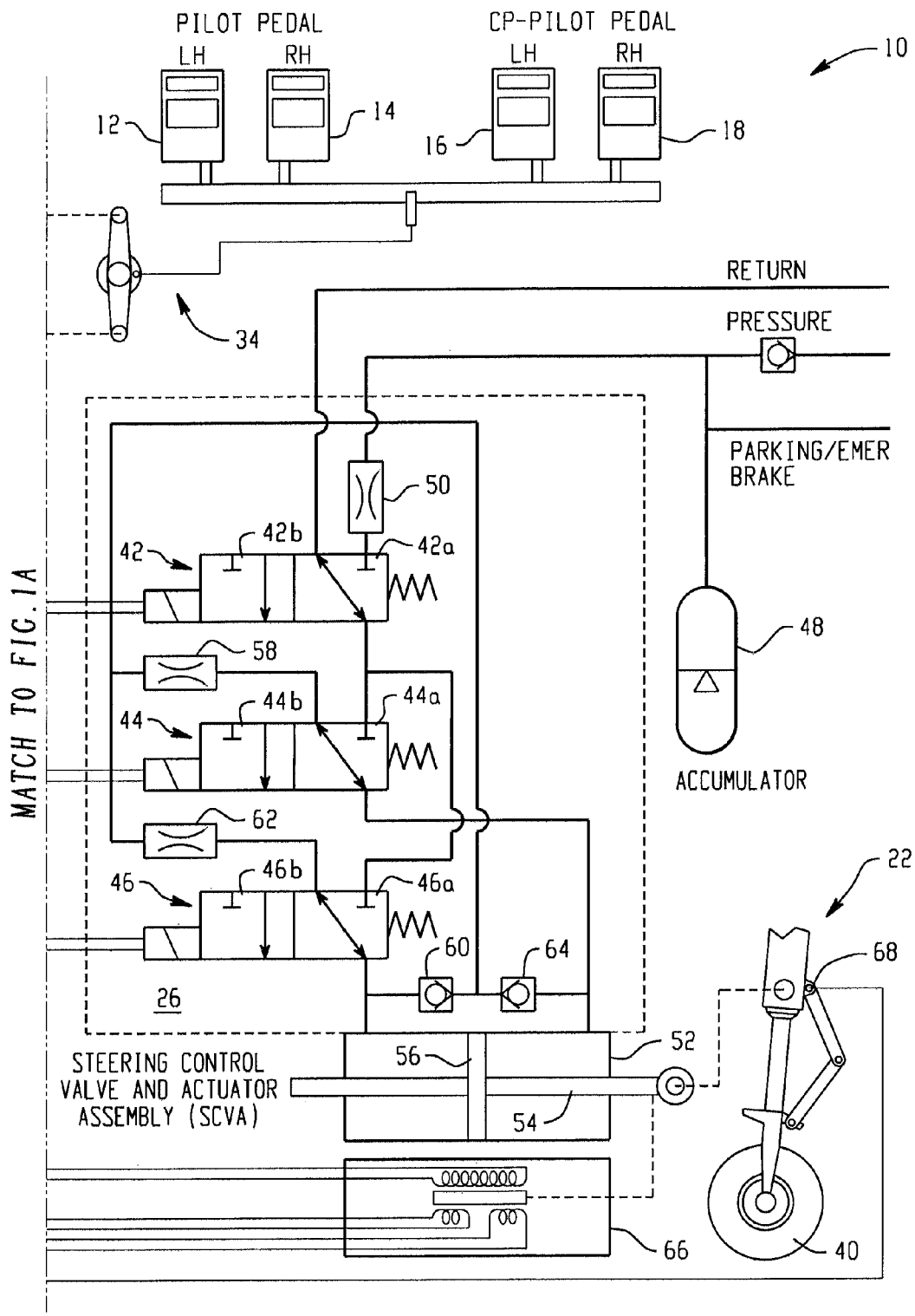

With reference to FIGS. 1A and 1B, a nose wheel steering system ("NWSS") 10 generally includes pilot rudder pedals, which include a left-hand rudder pedal 12 and a right-hand rudder pedal 14, and co-pilot rudder pedals, which include a left-hand rudder pedal 16 and a right-hand rudder pedal 18. The NWSS 10 also includes a nose landing gear 22 and the NWSS 10 controls the nose landing gear direction in accordance with rudder pedal operation. The illustrated NWSS 10 is a steer-by-wire system that is electrically controlled and hydraulically actuated. The steering angle output, i.e., the nose landing gear direction, is a function of aircraft speed and rudder pedal input.

The NWSS 10 includes a steering control unit 24 ("SCU"), a steering control valve and actuator assembly ("SCVA") 26, and pedal stroke transducers ("XDCERs"), which include a left-hand XDCER 28 and a right-hand XDCER 32. The rudder pedals 12, 14, 16 and 18 are mechanically linked to the respective XDCERs 28, 32 by a linkage 34. The SCU 24 is in communication with the rudder pedals 12, 14, 16 and 18 via the respective XDCERs 28, 32. The SCU 24 is also in communication with main landing gear ("MLG") (not shown) of the aircraft via an anti-skid control system 36, which can provide the SCU 24 the MLG wheel speed. The SCU 24 is also in communication with an aircraft avionics system 38. The aircraft avionics system 38 can include a caution alerting system ("CAS"), which can provide messages indicative of fault indications for the NWSS 10 in the cockpit of the aircraft. The aircraft avionics system 38 can also provide a rigging function and can include an input to receive aircraft ground speed data indicative of the aircraft ground speed.

The SCU 24 is also in communication with the SCVA 26, which controls the direction of a nose wheel 40, which is a component of the nose landing gear 22. The SCVA 26 includes a two-position shut-off valve 42, a two-position right-hand steering control valve 44, and a two-position left-hand steering control valve 46. In the illustrated embodiment, the shut-off valve 42 and the control valves 44 and 46 are solenoid operated valves that are biased toward a first operating position. The SCU 24 sends signals to the respective valves to control the operating positions of the valves.

When the shut-off valve 42 is in the first operating position 42a, fluid from a pressure source, e.g. a hydraulic pump (not shown) and an accumulator 48, is blocked and unable to travel through the shut-off valve. Upon receiving a signal from the SCU 24, the shut-off valve 42 can move to the second position 42b. In the second position 42b, pressurized fluid flows from the pressure source through a restrictor 50 and the shut-off valve 42 towards the right-hand steering control valve 44 and the left-hand steering control valve 46, which are both located downstream from the shut-off valve 42. The restrictor 50 controls the steering speed of the nose landing gear 22.

The right-hand steering control valve 44 operates between a first operating position 44a and a second operating position 44b. In the first operating position 44a, pressurized fluid from the pressure source is blocked from traveling through the right-hand steering control valve 44. In the second operating position 44b, pressurized fluid from the pressure source can travel through the right-hand steering control valve 44 and towards a hydraulic cylinder 52. A rod 54 extends through the cylinder 52 and a piston 56 connects with the rod 54 and is located within the cylinder 52. When in the second operating position 44b, fluid travels from the pressure source through the right-hand steering control valve 44 into the hydraulic cylinder 52 on a right-hand side of the piston 56 (per the orientation shown in FIG. 1B), which moves the rod 54 to turn the nose wheel 40 left. When in the first operating position 44a, fluid can travel from the cylinder 52 on the right-hand side of the piston 56 through the right-hand steering control valve 44 and a restrictor 58 to a left-hand side of the piston 56 into the hydraulic cylinder 52 through a left-hand check valve 60. The actuator (cylinder) 52 also works as a "shimmy damper." In the first operating position 44a, the actuator 52 is free to move to the right direction via the restrictor 58. This movement prevents nose wheel steering from shimmy vibration.

The left-hand steering control valve 46 operates between a first operating position 46a and a second operating position 46b. In the first operating position 46a, pressurized fluid from the pressure source is blocked from traveling through the left-hand steering control valve 46. In the second operating position 46b, pressurized fluid from the pressure source can travel through the left-hand steering control valve 46 and towards the hydraulic cylinder 52. When in the second operating position 46b, fluid travels from the pressure source through the left-hand steering control valve 46 into the hydraulic cylinder 52 on the left-hand side of the piston 56, which moves the rod 54 to turn the nose wheel 40 right. When in the first operating position 46a, fluid can travel from the cylinder 52 on the left-hand side of the piston 56 through the left-hand steering control valve 46 and a restrictor 62 to the right-hand side of the piston 56 into the hydraulic cylinder 52 through a right-hand check valve 64. In the first operating position 46a, the actuator 52 is free to move to the left direction via the restrictor 62. This movement prevents nose wheel steering from shimmy vibration.

The rod 54 mechanically connects with the nose landing gear 22 to control the direction of the nose wheel 40. The position of the rod 54 can be monitored by a steering position sensor 66, which is also in communication with the SCU 24. The direction of the nose wheel 40 can be based on the position of the rod 54. A weight sensor 68 can also be provided on the nose landing gear 22 to determine the nose landing gear weight on wheel ("WOW"). The weight sensor 68 is also in communication with the SCU 24.

Figure 2:
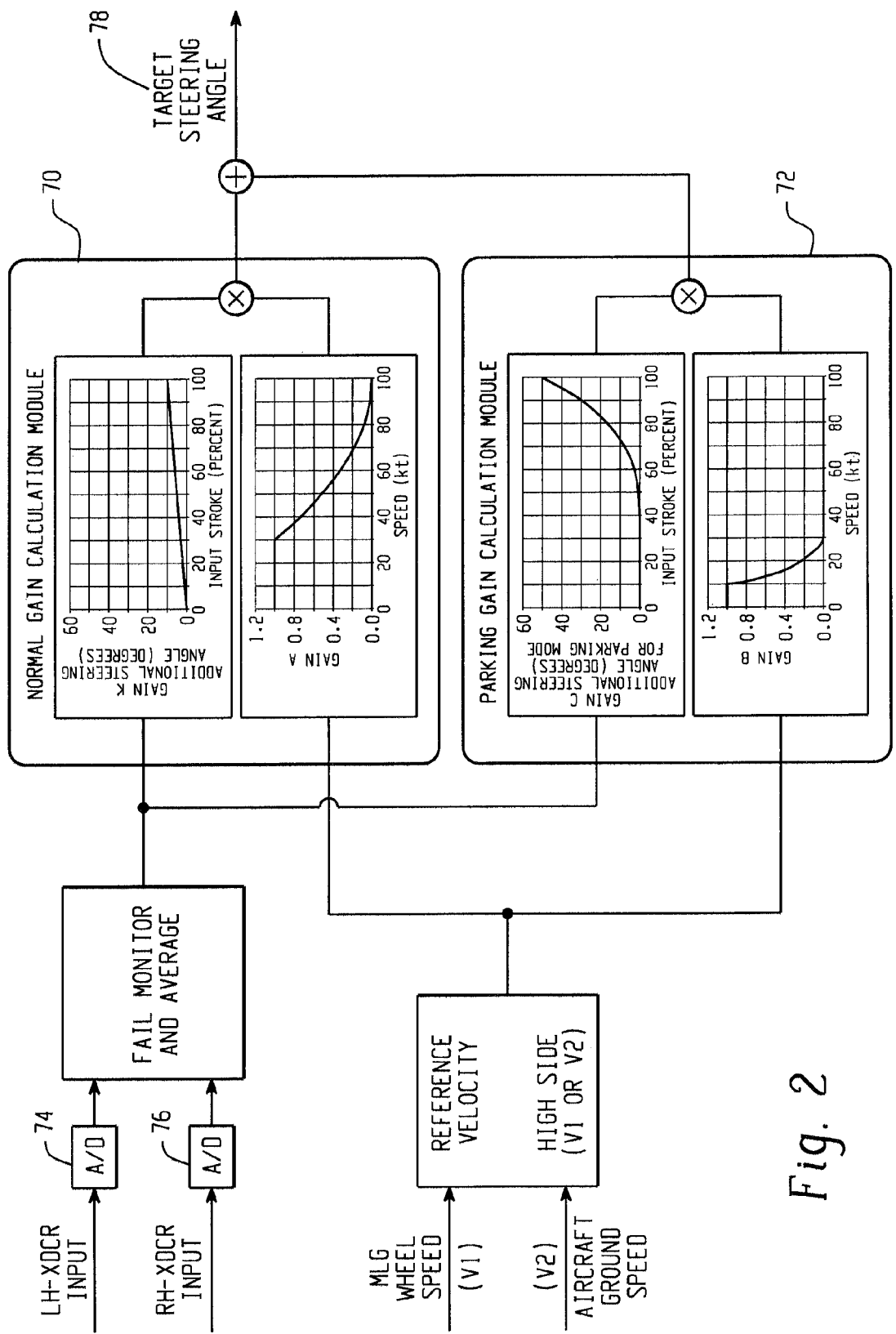
FIG. 2 schematically depicts a gain control algorithm that can be used in a method for determine a maximum steering angle for nose landing gear of the aircraft.

The SCU 24 is configured to determine a steering angle for the nose wheel 40. With reference to FIG. 2, the steering angle for the nose wheel 40 is based on calculations performed in a normal gain calculation module 70 and a parking gain calculation module 72. Each gain calculation module 70, 72 receives pedal stroke input data based on an input percentage of pedal stroke for a respective rudder pedal, e.g. the rudder pedals 12, 14, 16 and 18.

With reference to FIG. 1A, the LH-XDCER 28 and the RH-XDCER 32 are electrically connected to the SCU 24.

With reference to the example shown in FIG. 2, the data received from the XDCERs can be processed by analog-to-digital converters 74, 76, respectively. The data, now in digital form, can be monitored for failure and averaged prior to further processing in each of the gain calculation modules. The modules 70, 72 may only receive one of the data from the XDCERs 28, 32. In the disclosed embodiment, the modules 70, 72 receive the averaged data (arithmetic average) to ensure redundancy of the data from the XDCERs 28, 32. Each gain calculation module 70, 72 also receives aircraft speed data, which is based on MLG wheel speed and aircraft ground speed. The MLG wheel speed is received by the SCU 24 from the anti-skid control system 36 (FIG. 1A). The anti-skid control system 36 includes wheel speed sensors for the wheels of the MLG. The aircraft ground speed data is received by the SCU 24 from the aircraft avionics system 38 (FIG. 1A). As seen in FIG. 2, the aircraft speed, which is also referred to as REFERENCE VELOCITY in FIG. 2, is either the MLG wheel speed or the aircraft ground speed, whichever is higher. If the speed data is higher, the target steering angle is more restrictive in the exemplary embodiment. That is, the modules 70, 72 receive the higher speed data to prevent or inhibit aircraft turn over without fault.

The normal gain calculation module 70 determines a gain K based on the pedal stroke input data. The normal gain calculation module 70 also determines a gain A based on aircraft speed. In this example, the aircraft speed is based on at least one of the MLG wheel speed data and the aircraft ground speed data. The parking gain calculation module 72 determines a gain C based on the pedal stroke input data. The parking gain calculation module 72 also determines a gain B based on the aircraft speed. The NWSS 10 (FIGS. 1A and 1B) utilizes a gain control algorithm shown in FIG. 2 to control the steering sensitivity for different speeds and pedal stroke. A target steering calculation module 78 adds the normal gain and the parking gain to determine the target steering angle. A method for determining a target steering angle for the nose landing gear 22 is described in more detail below.

The method for determining the steering angle for the nose landing gear 22 can include receiving pedal stroke data via the XDCERs 28, 32 into the steering control unit 24. The pedal stroke data corresponds to a percentage of an input stroke of a rudder pedal, e.g. rudder pedals 12, 14, 16 and 18, on the aircraft. The data can be processed in analog-to-digital converters 74, 76, respectively.

The method for determining the steering angle for the nose landing gear 22 can further include receiving aircraft speed data into the steering control unit 24 (FIG. 1A). As mentioned above, receiving the aircraft speed data can include receiving MLG wheel speed, which corresponds to a wheel speed of the MLG, and an aircraft ground speed. As mentioned above, calculating the gain A and calculating the gain B can be based on whichever of the MLG speed and the aircraft ground speed is greater.

From experiments using an aircraft provided a steer-by-wire nose wheel steering system, it was turned up that the speed of the aircraft was usually 0-10 kt, when the aircraft was parking (parking speed range). It was also turned up that the speed of the aircraft was usually 10-30 kt, when the aircraft was taxiing (taxiing speed range). In addition, the speed of the aircraft was usually 30 kt or more, when the aircraft was taking off (take off speed range). It was found that 0-40% of the full pedal input was usually used when the aircraft was taxiing (taxiing pedal range). Therefore, the gain calculation modules 70, 72 vary the gain K, A, C, B according to the speed of the aircraft. Thus, pilots of the aircraft are able to get optimum steering angle at all conditions. In this embodiment, the critical values 10 kt, 30 kt, 100 kt, and 40% are merely examples. These numerical values are decided in response to weight and size of the aircraft, position of the center of the gravity of the aircraft, mounting locations of the landing gears, take off speed, mechanical features of the steering system and the like so as not to turnover the aircraft at any speed. Therefore, the aforementioned critical values are decided for each aircrafts' type. The mathematical formulae of gain K, A, C, and B, which are described in more detail below, are decided to materialize the effect of the charts in FIGS. 3-7. Accordingly, the mathematical formulae discussed below can be changed to materialize the effects of the charts in FIGS. 3-7 based on different parking speeds, taxiing speeds, take off speeds and rudder pedal inputs.

With continued reference to FIG. 2, the target steering angle is determined by a normal steering angle value (normal gain) and a parking additional steering angle value (parking gain). The normal gain calculation module 70 outputs the normal steering angle and the parking gain calculation module 72 outputs the parking additional steering angle. The method for determining the target steering angle for the nose landing gear 22 also includes calculating the gain K based on the received pedal stroke data. The relationship between input pedal, stroke and the gain K can be defined by the following formula;

$$y(x)=0.1*x$$

where "x" is the percentage of pedal stroke in non-dimensional units, where x=100% is defined as x=100, and "y" is the gain K in degree/percent units. As seen in FIG. 2, the gain K is linearly related or directly proportional to the input stroke of a rudder pedal, e.g. rudder pedals 12, 14, 16 and 18, of the aircraft.

The method for determining the normal steering angle for the nose landing gear 22 also includes calculating the gain A. The relationship between aircraft speed and the gain A can be defined by the following formulas:

if $x<=30$, then $y(x)=1$;

if $30<x\leq100$, then $y(x)=a*x^3+b*x^2+c*x+d$;

a=0,
b=2.0408 E−04,
c=−4.0816 E−02, and
d=2.0408 E+00; and if $100<=x$, then $y(x)=0$ where "x" is the aircraft speed in knots and "y" is the gain A in a non-dimensional units.

The SCU 24 has a "gain A" command in response to an aircraft speed with 100% of the input stroke command within the range shown in FIG. 2. As seen from the above formula, the gain A is exponentially related to the aircraft speed for aircraft speeds greater than 30 knots, which for this example is the maximum taxiing speed. The gain A is a constant for aircraft speeds less than 30 knots, and more particularly the gain A equals one for aircraft speeds less than 30 knots. The gain A is also constant for aircraft speeds greater than 100 knots, and more particularly the gain A equals 0 for aircraft speeds greater than 100 knots, which for this example is the critical maximum speed or the maximum speed that the aircraft does not turn over even at the maximum steering angle.

The method for determining the target steering angle for the nose landing gear 22 can further include calculating the gain C based on the received pedal stroke data. The relationship between input pedal stroke and the gain C can be defined by the following formulas:

if $x<=40\%$, then $y(x)=0$;

if $40\%<x<100\%$, then $y(x)=a*x^3+b*x^2+c*x+d$; and if $100\%<x$, then $y(x)=a*100^3+b*100^2+c*100+d$ a=1.6667 E−04,
b=−1.6111 E−02,
c=4.8889 E−01, and
d=−4.4444 E+00 where "x" is the percentage of pedal stroke in a non-dimensional unit, x=100% is defined as x=100, "y" is the gain C in degree/percent unit.

The relationship between input stroke (percentage) and the gain C is depicted in the graph shown in FIG. 2. The gain C can be exponentially related to the input stroke of the rudder pedal at inputs strokes greater than 40%. The gain C can be constant at input strokes less than 40%. More particularly, the gain C can equal 0 at input strokes less than 40%.

Figure 5:
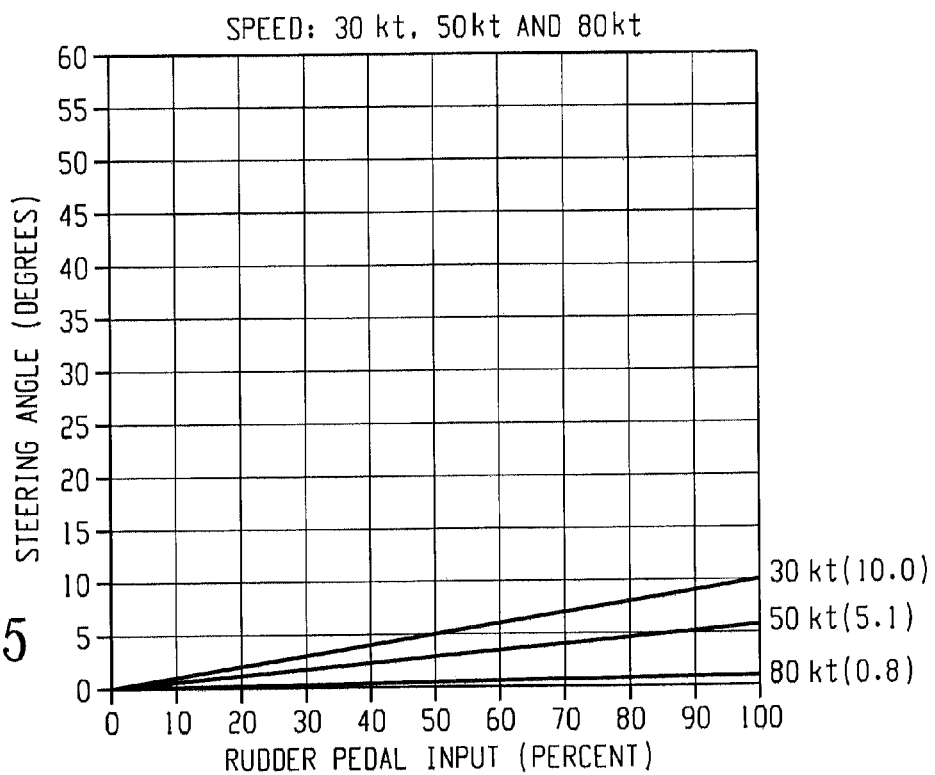

The method for determining the target steering angle for the nose landing gear 22 can further include calculating the gain B based on the aircraft speed. The relationship between aircraft speed and the gain B can be defined by the following formulas:

if $x<=10$, then $y(x)=1$;

if $10<x<30$, then $y(x)=a*x^3+b*x^2+c*x+d$;

a=0,
b=2.3571 E−03,
c=−1.4428 E−01, and
d=2.2071 E+00; and if $30<=x$, then $y(x)=0$ where "x" is the aircraft speed in units of knots, "y" is the gain B in non-dimensional units. In this exemplary method, the gain B is exponentially related to the aircraft speed for aircraft speeds greater than 10 knots. The gain B is also exponentially related to the aircraft speed for aircraft speeds less than 30 knots. The gain B can be a constant for aircraft speeds less than 10 knots, which in this example is the maximum parking speed. More particularly, the gain B can equal one for aircraft speeds less than 10 knots. The gain B can be constant for aircraft speeds greater than 30 knots. More particularly, the gain B can equal zero for aircraft speeds greater than 30 knots. The target steering angle for the nose landing gear 22 is determined by the normal steering angle and the parking additional steering angle. The normal gain calculation module 70 outputs the normal steering angle and the parking gain calculation module 72 outputs the parking additional steering angle. The normal steering angle is a product of the gain K and the gain A as depicted in FIG. 2. The parking gain calculation module 72 outputs zero as an additional steering angle at speeds of 30-100 knots. Accordingly, since the normal steering angle is the product of gain K (linear) and the gain A (curve) depicted in FIG. 2, this produces a linear steering angle relationship with pedal input stroke from 0 to 100% at speeds of 30-100 knots, which is depicted in FIG. 5.

Figure 3:
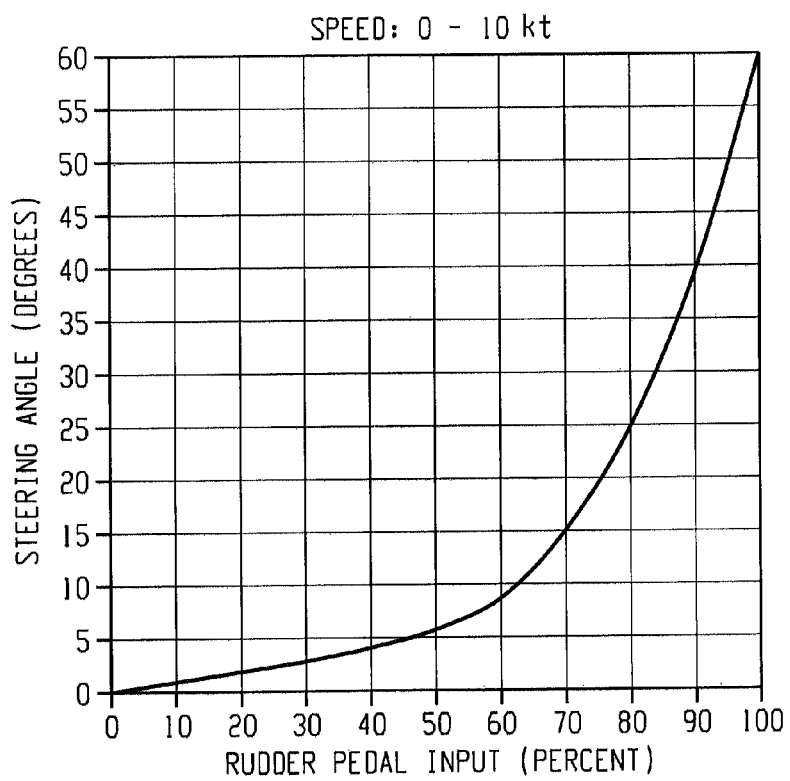
FIGS. 3-6 schematically depict rudder pedal input versus steering angle characteristics for different speeds of the aircraft.
Figure 4:
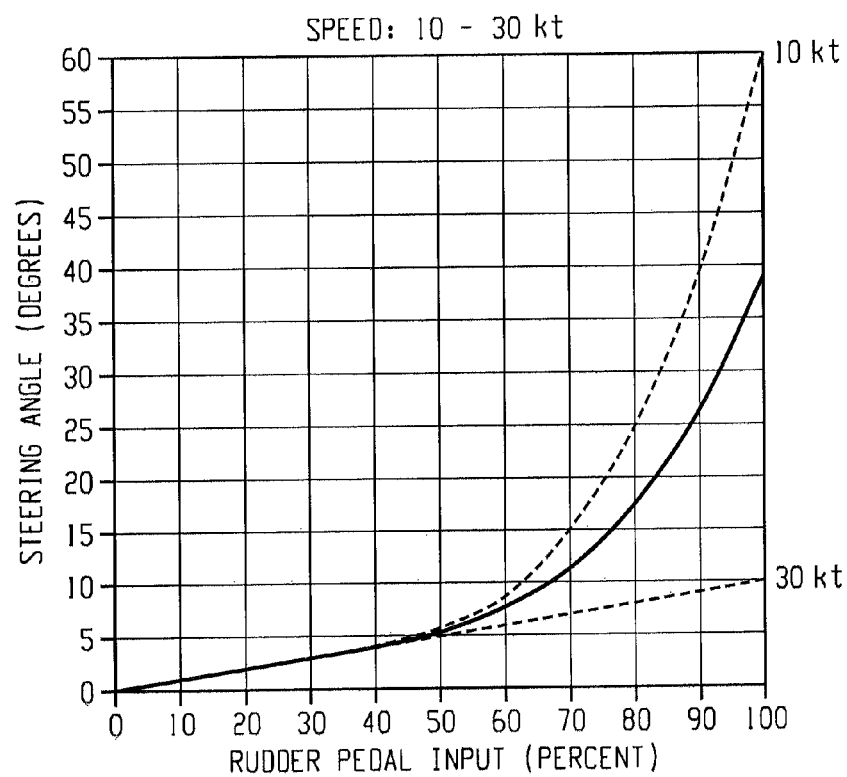
Figure 6:
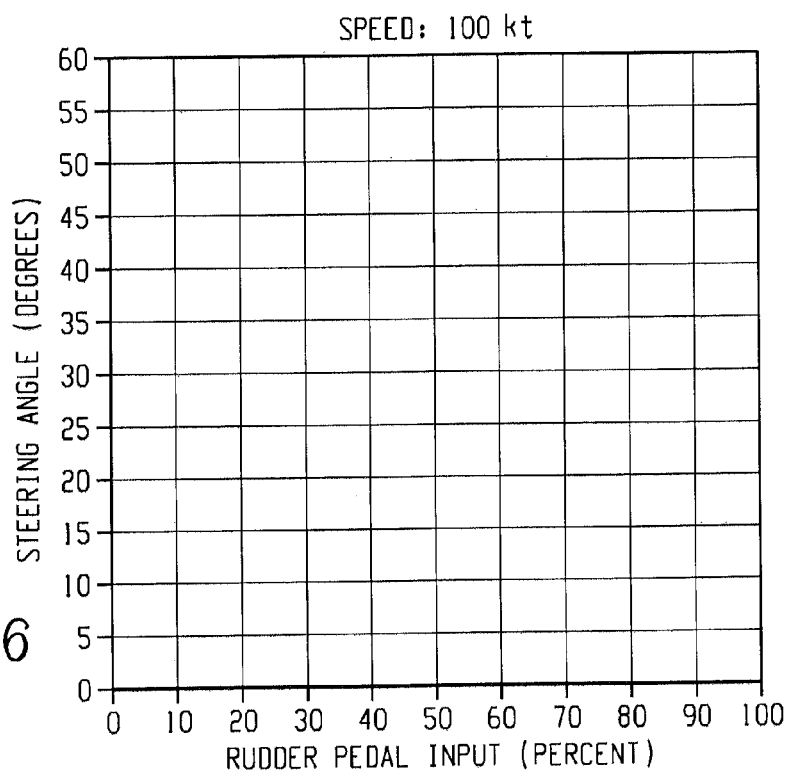

With reference back to FIG. 2, the target steering angle is a summation of the normal steering angle and the parking additional steering angle. The result of the summation of the two products is a third degree polynomial-like relationship for pedal strokes 40-100% at a speed of 0-30 knots, which is shown in FIG. 3 and FIG. 4. This allows for an exponentially larger steering angle for pedal strokes greater than 40%, which can be seen by comparing the upper dashed line in FIG. 4 to the lower dashed line in FIG. 4. The upper dashed line depicted in FIG. 4 corresponds to the line depicted in FIG. 3 and the lower dashed line in FIG. 4 corresponds to the line depicted in FIG. 5. At a speed of 0-30 knots, the gain A is 1.0 and the parking gain calculation module 72 output zero for the pedal strokes from 0-40%. Therefore, the target steering angle for pedal strokes from 0%-40% remains a linear relationship in the parking speed range and the taxiing speed range, which is depicted in FIGS. 3 and 4. In addition, at a speed of 30 knots or more, the parking gain calculation module 72 outputs zero for the pedal strokes from 0%-100%. Therefore, the target steering angle for pedal strokes from 0%-100% also remains a linear relationship in the take-off speed range, which is depicted in FIGS. 5 and 6.

With reference back to FIG. 1A, a nose wheel engage switch 80 can be provided with the NWSS 10. Activation of the nose wheel engage switch provides power to the SCU 24.

Figure 8:
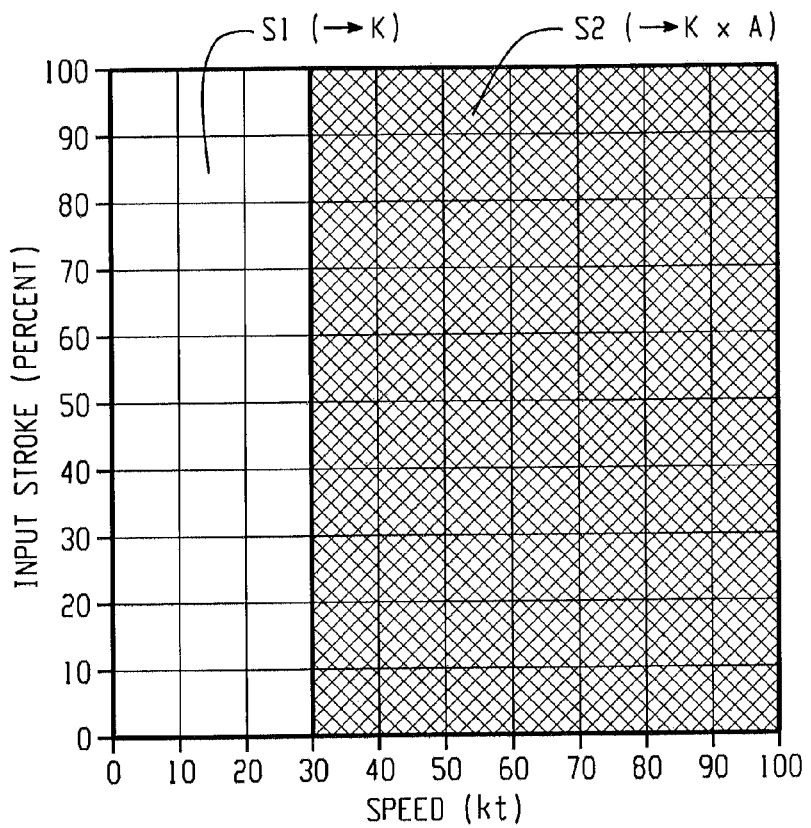
FIGS. 8 and 9 schematically depict maps to illuminate features of gain control modules.
Figure 9:
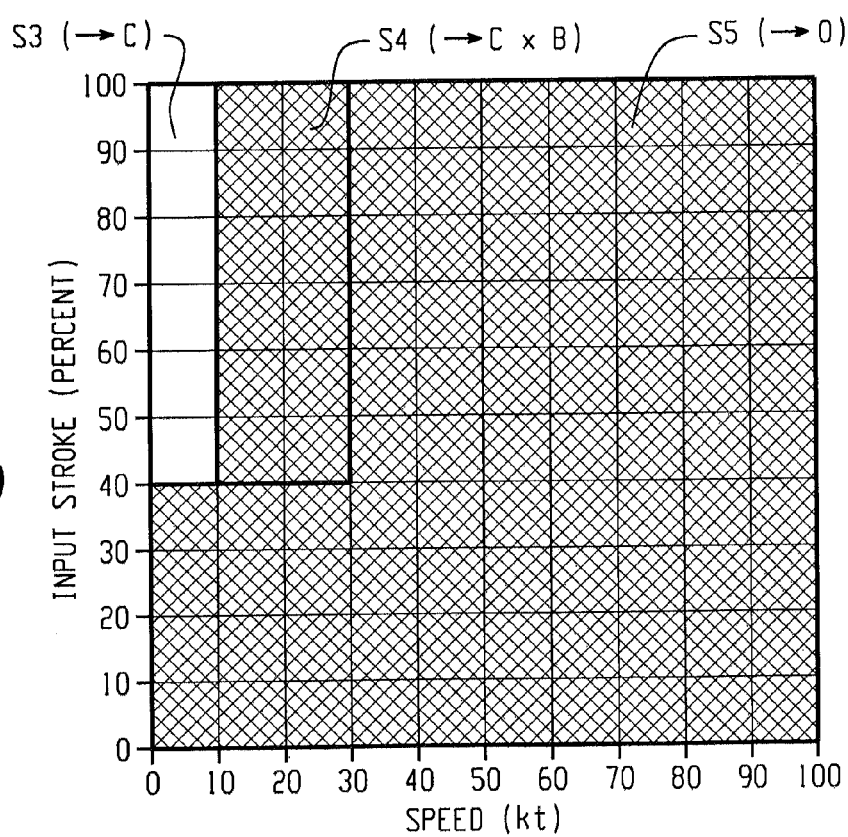

FIGS. 8 and 9 show maps M1, M2, respectively, to illuminate features of the gain calculation modules 70, 72, respectively. With reference to FIG. 8, the gain calculation module 70 outputs gain K when the speed of the aircraft is 0-30 kt (see the area S1 of the map M1 in FIG. 8). That is, in the parking speed range or the taxiing speed range, the gain calculation module 70 outputs only gain K, because the gain A is 1.0 in these range (see FIG. 2). The gain calculation module 70 outputs gain K×gain A, when the speed of the aircraft is 30 kt or more (take off speed range). This is denoted by area S2 of the map M1 in FIG. 8.

With reference to FIG. 9, the gain calculation module 72 outputs zero when the speed of the aircraft is 30 kt or more (see area S5 of the map M2 in FIG. 9). That is, in the take off speed range, the gain calculation module 72 outputs zero, because the gain B is zero in this range. The gain calculation module 72 also outputs zero when the pedal input is 0-40% (taxiing pedal range), because the gain C is zero in this range (see FIG. 2). On the other hand, when the pedal input is 40% or more, the gain calculation module 72 outputs gain C in the parking speed range, because the gain B is 1.0 in this range (see area S3 of the map M2 in FIG. 9). In addition, the gain calculation module 72 outputs gain C×gain B in the taxiing speed range (see area S4 of the map M2 in FIG. 9).

As mentioned above, conventional nose wheel steering systems employ simplified two-stage steering modes according to aircraft speed. The subject nose wheel steering system, in contrast, employs a nonstep relationship between the aircraft speed and the maximum steering angle (see, for example, FIG. 7).

In the parking speed range (0-10 kt) or the taxiing speed range (10-30 kt), and the pedal stroke is 0-40%, the target steering angle is increased in direct proportion to the input stroke (see FIGS. 3 and 4). As mentioned above, 0-40% of the full pedal input is usually used when the aircraft is taxiing. Thus, pilots can operate the aircraft to taxi accurately because the target steering angle is increased in direct proportion to the input stroke in this condition. In addition, the gain calculation modules 70, 72 allow for an exponentially larger steering angle for pedal strokes greater than 40% and the aircraft's speed is 0-10 kt (See FIG. 3). This makes it possible to match the pilots' steering feelings. Furthermore, pilots can turn a steering to maximum angle (60°). This makes the pilot's task to park the aircraft easier to accomplish. When the pedal stroke is 40% or more, the target steering angle is decreased gradually from 10 kt to 30 kt (see FIG. 4). This transition prevents or inhibits the aircraft to turn over and keep the pilots' steering feelings as well.

In conditions where the aircraft speed is 30 kt or more, the target steering line is linear, and the gradient of the line gets lower according to the speed of the aircraft (see FIG. 5). This transition can inhibit aircraft turnover and it is easier to control the steering for pilots at high ground speed because the target steering angle varies in direct proportion to the rudder pedal input. In general, pilots would like to use maximum steering angle when parking the aircraft (parking range). On the other hand, it is preferable for the steering angle to be limited to low angle at 30 kt or more (take off speed range), because pilots can control the direction of the aircraft with the rudder in the take off condition too. The present steering system can satisfy both of these conditions.

Figure 7:
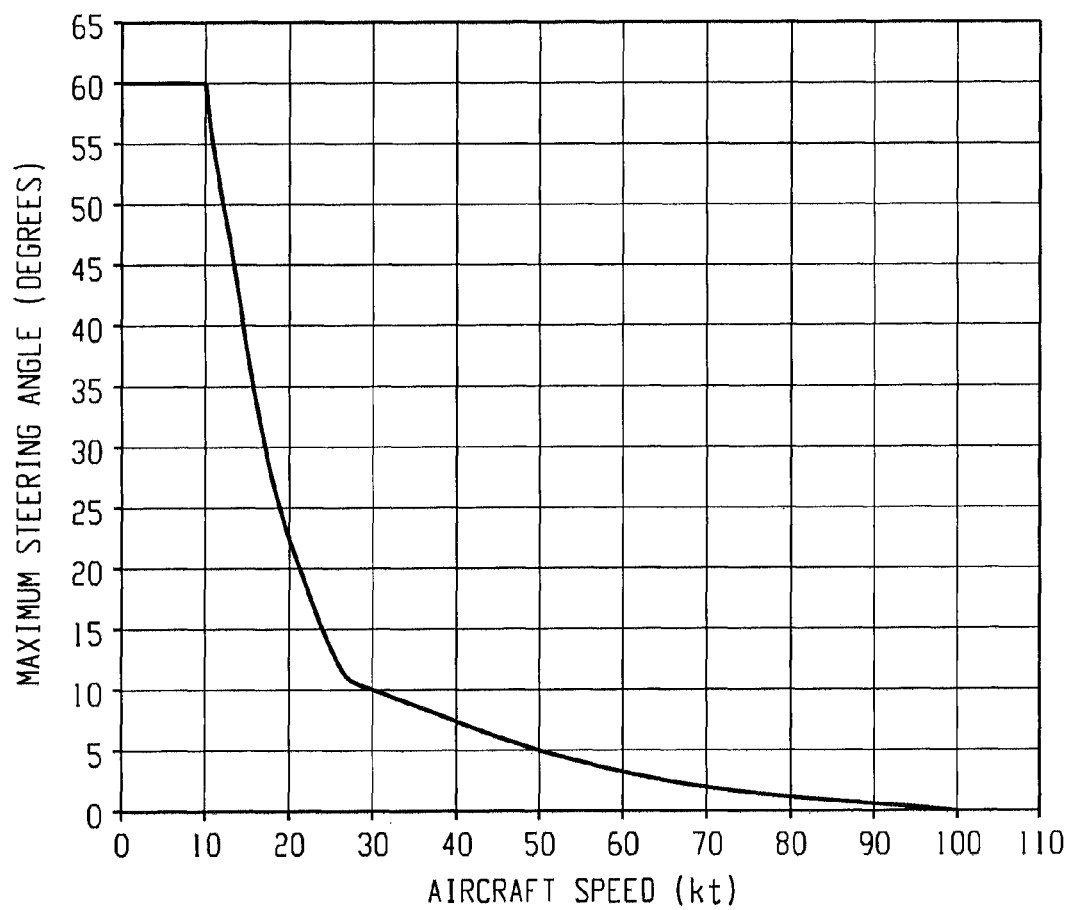
FIG. 7 depicts the relationship between maximum steering angle and aircraft speed.

When the speed of the aircraft is over 100 kt, the target steering angle is zero (see FIG. 6). This value 100 knots is the critical maximum speed that the aircraft provided with the present steering system does not turn over even at the maximum steering angle. FIG. 7 shows the relation between the aircraft speed and the maximum steering angle. As shown in FIG. 7, the maximum steering angle is constant (60 degrees) at the speed of 0-10 kt, and the maximum steering angle is decreasing continuously from 10 kt to 100 kt. This line is made by the gain calculation module 70, 72 as shown in FIG. 2. This line is located on the slightly inside of the critical line (not shown in FIG. 7) to turn over the aircraft. Therefore, the aircraft provided with the subject steering control system should not turnover at any speed.

Figure 10:
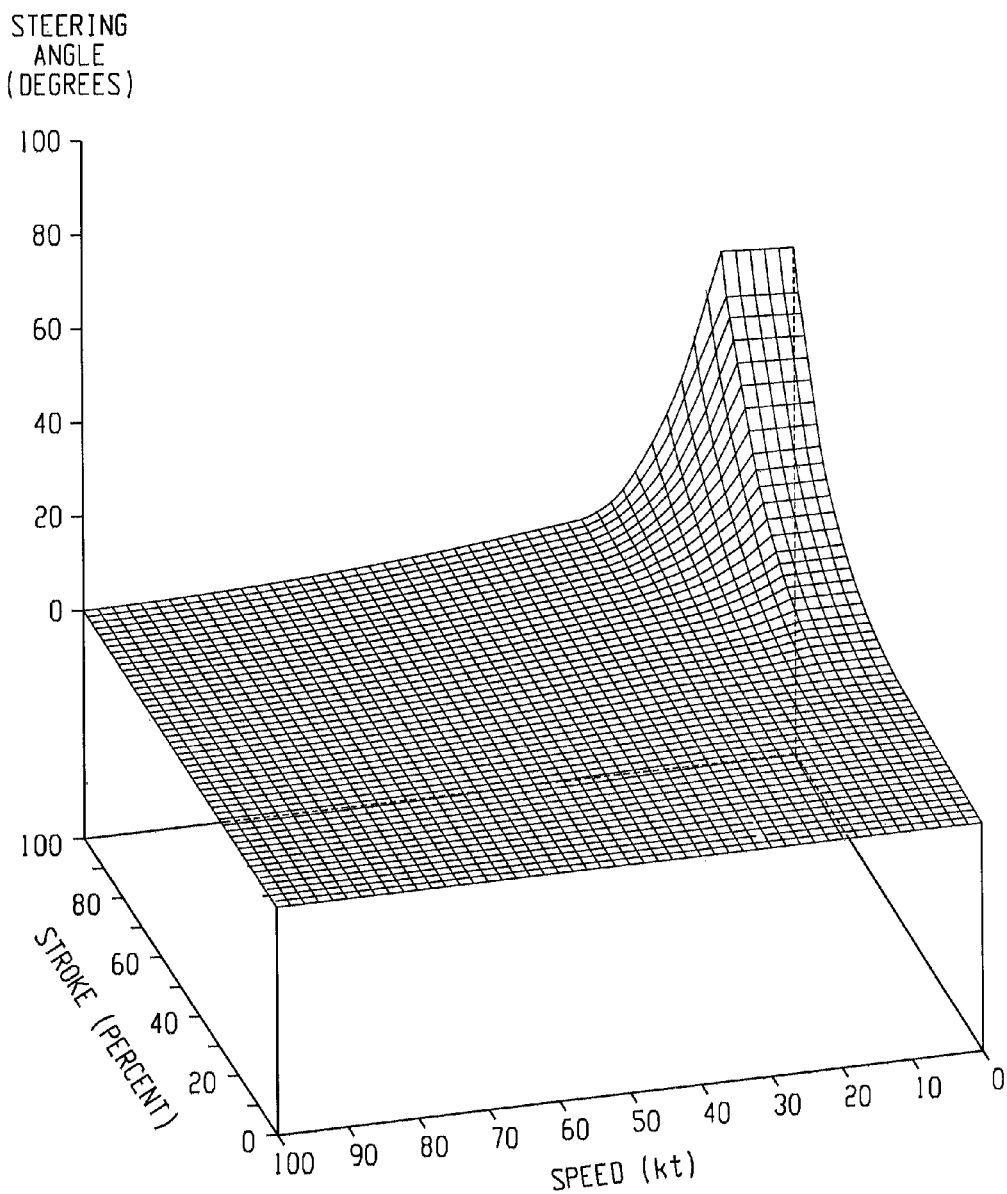
FIG. 10 shows the relationship among the speed of the aircraft, the pedal stroke and the steering angle.

In the parking speed range (0-10 kt in this embodiment), the maximum steering angle is the maximum constant angle of the aircraft's steering mechanical system (see FIG. 7—60 degrees in the embodiment). The maximum steering angle is decreasing continuously from taxiing speed range to the critical maximum speed (100 kt in this embodiment). The line in FIG. 7 is located on the slightly inside of the critical line to turnover the aircraft. The present nose wheel steering system also substantializes the effect of the charts in FIGS. 3 and 4. That is, in the parking speed range (0-10 kt in this embodiment) or the taxiing speed range (10-30 kt in this embodiment), the steering angle is directly proportional to the pedal input in the taxiing pedal range (0-40% in this embodiment) and is exponentially increasing according to the pedal input in the 40% or more of the pedal input range. Furthermore, the steering angle is gradually decreasing according to the speed of the aircraft in the 40% or more of the pedal input range (FIG. 4). In the take off speed range (30 kt or more in this embodiment), the present invention substantializes the chart which is linear and its gradient gets lower according to the speed of the aircraft. At the critical speed or more (100 kt in this embodiment), the steering angle is zero in the present steering system (FIG. 6). The critical speed is the maximum speed that the aircraft does not turn over even at the maximum steering angle. FIG. 10 shows the relationship among the speed of the aircraft, the pedal stroke and the steering angle.

A nose wheel steering system and a method for determining a steering angle for a nose landing gear have been described above with particularity. Modifications and alterations will occur to those who are skilled in the art after reading and understanding the preceding detailed description. The appended claims are not to be limited to only the embodiments described above.

It will be appreciated that various of the above-disclosed and other features and functions, or alternatives or varieties thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method for determining a target steering angle for nose landing gear of an aircraft, the method comprising:

receiving rudder pedal input data into a steering control unit;

receiving aircraft speed data into the steering control unit;

calculating a normal gain which is a positive quantity in all aircraft speed and pedal stroke ranges in the steering control unit;

calculating a parking gain which is a positive quantity in parking and taxiing speed ranges in the steering control unit;

adding the normal gain and the parking gain to determine a target steering angle in the steering control unit; and controlling the nose landing gear direction based on the determined target steering angle.

2. The method of claim 1, wherein a maximum steering angle for the nose landing gear is constant at a maximum value in the parking speed range and the maximum steering angle decreases continuously from a maximum parking speed to a maximum critical speed.

3. The method of claim 2, wherein the maximum steering angle is zero at the maximum critical speed.

4. The method of claim 1, wherein in take-off speed range, the target steering angle is directly proportional to rudder pedal input.

5. The method of claim 4, wherein in the take-off speed range, a gradient of a line, which depicts the target steering angle versus the rudder pedal input, decreases as the aircraft speed increases.

6. The method of claim 1, wherein in the parking speed and the taxiing speed ranges, the target steering angle is directly proportional to the rudder pedal input in a taxiing pedal range.

7. The method of claim 6, wherein the target steering angle exponentially increases according to the rudder pedal input for pedal inputs greater than the taxiing pedal range.

8. The method of claim 7, wherein the target steering angle gradually decreases according to the speed of the aircraft for pedal inputs greater than the taxiing pedal range.

9. The method of claim 1, wherein the normal gain is calculated by multiplication of gain K and gain A, wherein the parking gain is calculated by multiplication of gain C and gain B, wherein gain K and gain C are calculated according to the rudder pedal input, wherein gain A and gain B are calculated according to the aircraft speed.

10. A method for determining a target steering angle for nose landing gear of an aircraft, the method including:

receiving rudder pedal input data into a steering control unit, wherein the rudder pedal input data corresponds to a percentage of an input stroke of a rudder pedal on an aircraft;

receiving aircraft speed data into the steering control unit;

calculating a gain K based on the received rudder pedal input data in the steering control unit;

calculating a gain A based on the received aircraft speed in the steering control unit;

calculating a gain C based on the received rudder pedal input data in the steering control unit;

calculating a gain B based on the received aircraft speed in the steering control unit;

determining a target steering angle for a nose landing gear in the steering control unit, wherein the target steering angle is a summation of normal gain and parking gain, wherein the normal gain is a product of the gain K and the gain A and the parking gain is a product of the gain C and the gain B; and controlling the nose landing gear direction based on the determined target steering angle.

11. The method of claim 10, wherein the gain K is a linearly related to the rudder pedal input of the aircraft.

12. The method of claim 10, wherein the gain A is exponentially related to the received aircraft speed for received aircraft speeds greater than a maximum taxiing speed, and the gain A is constant for received aircraft speeds less than the maximum taxiing speed.

13. The method of claim 10, wherein the gain B is a constant in a parking speed range, the gain B is exponentially related to the received air craft speed in a taxiing speed range, and the gain B is zero in a take off speed range.

14. The method of claim 10, wherein the gain C is zero in a taxiing pedal range, and the gain C is exponentially related to the rudder pedal input for rudder pedal inputs greater than a maximum taxiing pedal range stroke.

15. A steering control unit ("SCU") for a nose wheel steering system for an aircraft, the SCU comprising:

a normal gain calculation module, wherein the normal gain calculation module calculates a normal gain, which is a positive quantity in all aircraft speed and pedal stroke ranges;

a parking gain calculation module, wherein the parking gain calculation module calculates a parking gain, which is a positive quantity in parking and taxiing speed ranges;

a target steering calculation module that adds the normal gain and the parking gain to determine a target steering angle; and a control signal output for controlling a nose wheel steering direction based on the determined target steering angle.

* * * * *